United States Patent
Zillich et al.

(10) Patent No.: US 10,790,520 B2
(45) Date of Patent: Sep. 29, 2020

(54) FUEL CELL

(71) Applicant: Audi AG, Ingolstadt (DE)

(72) Inventors: Christian Martin Zillich, Braunschweig (DE); Friedhelm Walkling, Braunschweig (DE)

(73) Assignee: Audi AG, Ingolstadt (DE)

( * ) Notice: Subject to any disclaimer, the term of this patent is extended or adjusted under 35 U.S.C. 154(b) by 378 days.

(21) Appl. No.: 15/520,816

(22) PCT Filed: Oct. 8, 2015

(86) PCT No.: PCT/EP2015/073257
§ 371 (c)(1),
(2) Date: Apr. 20, 2017

(87) PCT Pub. No.: WO2016/062550
PCT Pub. Date: Apr. 28, 2016

(65) Prior Publication Data
US 2017/0317361 A1    Nov. 2, 2017

(30) Foreign Application Priority Data

Oct. 21, 2014 (DE) .......... 10 2014 221 351

(51) Int. Cl.
*H01M 8/0276* (2016.01)
*H01M 8/0284* (2016.01)
*H01M 8/0258* (2016.01)

(52) U.S. Cl.
CPC ....... *H01M 8/0276* (2013.01); *H01M 8/0258* (2013.01); *H01M 8/0284* (2013.01)

(58) Field of Classification Search
CPC . H01M 8/0258; H01M 8/0276; H01M 8/0284
See application file for complete search history.

(56) References Cited

U.S. PATENT DOCUMENTS

| | | | |
|---|---|---|---|
| 2003/0150162 A1* | 8/2003 | Inagaki | H01M 8/0267 48/195 |
| 2007/0231661 A1* | 10/2007 | Hayashi | H01M 8/0247 429/510 |
| 2009/0246586 A1 | 10/2009 | Kawabata et al. | |
| 2009/0263702 A1 | 10/2009 | Vyas et al. | |

(Continued)

FOREIGN PATENT DOCUMENTS

| | | |
|---|---|---|
| CN | 100557870 C | 11/2009 |
| DE | 10 2006 056 468 A1 | 7/2007 |
| DE | 11 2007 000 860 T5 | 9/2009 |

(Continued)

*Primary Examiner* — Lingwen R Zeng
(74) *Attorney, Agent, or Firm* — Seed Intellectual Property Law Group LLP

(57) ABSTRACT

The invention relates to a fuel cell (10) having a stack comprising a bipolar plate (20) which has a flow field (22) formed by a profiled section of the bipolar plate (20), and an elongated sealing element (21) which at least partially surrounds the flow field (22), and a membrane electrode assembly (30). It is provided that, inside a cavity (25) formed between the membrane electrode assembly (30) and the bipolar plate (20) in a region between the sealing element (21) and the flow field (22), a filling agent (24) is arranged which extends in the extension direction of the cavity (25).

13 Claims, 4 Drawing Sheets

(56) References Cited

U.S. PATENT DOCUMENTS

Figure 1:
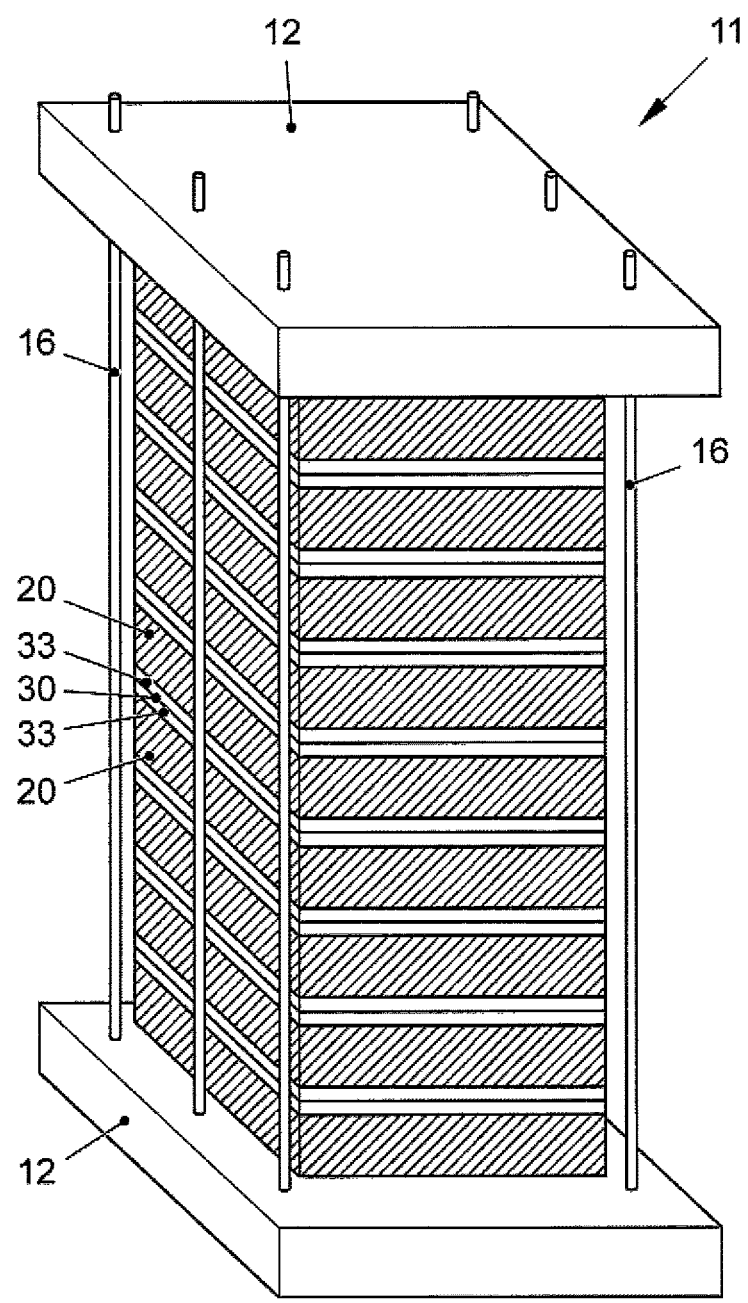

2009/0286121 A1* 11/2009 Morimoto ............ H01M 8/0273
429/494

FOREIGN PATENT DOCUMENTS

| DE | 10 2009 017 906 A1 | 10/2009 |
|----|--------------------|---------|
| DE | 11 2007 000 072 T5 | 11/2009 |
| DE | 10 2009 039 901 A1 | 3/2011 |
| EP | 1 465 272 A2 | 10/2004 |
| EP | 2 445 046 A1 | 4/2012 |
| WO | 2013/126075 A1 | 8/2013 |

* cited by examiner

FUEL CELL

The invention relates to a fuel cell having a stack of at least one bipolar plate and a membrane electrode assembly stabilized by a frame. Said bipolar plate comprises a flow field formed by a profiled section of the bipolar plate.

Fuel cells use the chemical conversion of a fuel with oxygen into water in order to generate electrical energy. For this purpose, fuel cells contain as a core component what are known as membrane electrode assemblies (MEA), which are a combination of an ion-conductive, in particular proton-conductive, membrane and an electrode (anode and cathode) respectively arranged on both sides of the membrane. Additionally, gas diffusion layers (GDL) may be arranged on both sides of the membrane electrode assembly on the sides of the electrodes facing away from the membrane. Generally, the fuel cell is constituted by a plurality of MEAs arranged in the stack, the electrical power outputs of which MEAs accumulate. During operation of the fuel cell, the fuel, in particular hydrogen $H_2$ or a gas mixture containing hydrogen, is guided to the anode where an electrochemical oxidation of $H_2$ to $H^+$ with loss of electrons takes place. Via the electrolyte or the membrane that separates the reaction chambers gas-tight from one another and electrically insulates them, the protons $H^+$ are transported from the anode chamber into the cathode chamber (in a water-bound or water-free manner). The electrons provided at the anode are guided to the cathode via an electrical line. The cathode receives oxygen or a gas mixture containing oxygen, so that a reduction of $O_2$ to $O^{2-}$ with gain of electrons takes place. At the same time, these oxygen anions react in the cathode chamber with the protons transported via the membrane to form water. As a result of the direct conversion of chemical into electrical energy, fuel cells have improved efficiency compared to other electricity generators because the Carnot factor is avoided.

The fuel cell is formed by a plurality of individual cells arranged in the stack, which is why this is also called a fuel cell stack. Arranged between the membrane electrode assemblies are bipolar plates which ensure that the individual cells are supplied the operating media, i.e. the reactants and a coolant. In addition, the bipolar plates ensure an electrically conductive contact to the membrane electrode assemblies.

Bipolar plates are mostly formed by a pair of profiled plates which respectively comprise a coolant side and a cell side, and the two plates are arranged and connected such with respect to one another that channels for transporting coolant form between the coolant sides facing one another. In their active region, the plates have a group of grooves or channels which form open flow or current fields on their cell sides for distributing the reactants over the surfaces of the respective anodes and cathodes. Between the plates within the bipolar plate, coolant channels are formed and distribute coolant over the fuel cell stack in order to cool it.

In order to isolate the anode or cathode chamber physically from the environment of the fuel cell, the cell stacks comprise sealing elements in an edge region of the bipolar plates. These sealing elements serve to seal and electrically insulate, and are typically arranged on the bipolar plate in the shape of a frame extending around the active and inactive region.

In known fuel cell stacks, the sealing element and the flow field are spaced apart from one another in order to absorb manufacturer's tolerances of the membrane electrode assembly, to make a welded seam, and to avoid the diffusion layer and the membrane overlapping the sealing element. An overlapping of the diffusion layer and the sealing element may result in an undesired leakage of gaseous operating media. The sealing element and the flow field spaced apart from it therefore form a gap, which results in the formation of a cavity in the stack. This cavity causes a quantity of reactant gases to bypass the active region of the bipolar plates, which is also called reactant bypass flow. The reactant bypass flow is uneconomical since the reactant gas is not led to the active region of the fuel cell stack and is thus not available for the electrochemical reaction. Moreover, the reactant bypass flow results in a pressure loss in the active region, which must be counteracted by an increased supply of the respective reactant gas. As a result of the lack of reactant, the reactant bypass flow may furthermore have an undesired effect on the durability, reliability, and efficiency of the fuel cell stack.

In order to solve this problem, DE 10 2009 017 906 A1 proposes to arrange a barrier layer on the sealing element, which barrier layer extends inward toward the active region of the bipolar plate and thus reduces the reactant bypass flow.

This solution is disadvantageous in that a gap must be provided in order to ensure that the membrane electrode assembly is not destroyed by the inflexible bipolar plate if the cell is compressed.

The invention is now based on the task of providing an alternative solution to the problems of the prior art, and in particular of further reducing or preventing the reactant bypass flow.

This task is achieved by a fuel cell having the features of the independent claim. The invention thus relates to a fuel cell having a stack having a bipolar plate comprising a flow field formed by a profiled section of the bipolar plate, and an elongated sealing element, which at least partially surrounds the flow field. It is provided according to the invention that a filling agent is arranged inside a cavity formed between the sealing element and the flow field, which filling agent extends in the extension direction of the cavity.

The advantage of the fuel cell according to the invention exists in that the free volume inside the cavity is reduced. The volume of the reactant bypass flow is thus also reduced. This leads to the reactant consumption being significantly reduced, and a loss of reactant gas as a result of reactant bypass flows not needing to be counteracted by an increase in pressure or an increased mass transport of reactant gas. Moreover, compared to traditional methods for reducing the reactant bypass flows, the membrane electrode assembly remains undamaged to the largest extent possible. The fuel cell according to the invention makes it possible to reduce the reactant bypass flow independently of any manufacturing tolerances of the membrane electrode assembly that have to be maintained.

In this document, "cavity" refers to a gap or hollow space that forms between the bipolar plate and a layer adjoining the bipolar plate in the stack, i.e. the membrane electrode assembly and/or a gas diffusion layer of the same, in a region between the sealing element and the flow field of the bipolar plate. The cavity generally results from the profile structure of the bipolar plate and is defined on the one hand by the height of the profile structure in the region of the flow field, and on the other hand by the height of the sealing element. The cavity extends in parallel along the flow field. On each side of a bipolar plate, i.e. on the anode and the cathode side, two cavities thus respectively result which extend between the sealing element and the flow field. Advantageously, both cavities of in particular both bipolar plate sides are provided with the filling agent. The sealing element is a sealing unit which extends along the outer edge of the bipolar plate and, for example, is designed as a bead gasket and/or polymer seal.

A preferred embodiment of the invention provides that the filling agent extends along a length of the flow field. The advantage of this embodiment consists in the reactant bypass flow being displaced extensively, and thus effectively, over the length of the flow field in this arrangement. In this case, the filling agent preferably takes up more than half, in particular more than two thirds, preferably more than three quarters of the volume of the cavity. The filling agent may in this case have a round, ellipsoid, rectangular, square, or polygon cross section.

It is in particular preferred that a height $h_F$ of the filling agent in non-compressed form, i.e. prior to assembly of the stack, is greater than the height $h_P$ of the profiled section of the flow field. This embodiment advantageously results in a contact being brought about between the filling agent and the layer adjacent to the bipolar plate, i.e. the membrane electrode assembly and/or the gas diffusion layer, this region thus being sealed in a gas-tight manner, and the reactant bypass flow being prevented. In addition, a compression of the gas diffusion layer and the membrane electrode assembly results, and thus a stabilization of the same in case of gas-tight contact.

It is furthermore preferred if the filling agent is a polymer, in particular an elastomer or a thermoplastic elastomer (TPE). These materials, in particular elastomers or TPEs, are characterized in that they can be easily and reversibly deformed by external pressure. They can thus adapt to the outer shape of the cavity particularly well, are easy to handle in doing so and are gas tight with respect to reactants. Particularly advantageously, such elastomer materials are used that already deform at a pressure that does not damage the membrane electrode assembly. It is thus achieved that a region between the membrane electrode assembly and the bipolar plate, or between the frame of the membrane electrode assembly and the bipolar plate, is also sealed off by the filling agent in a gas-tight manner, and that no clearance must be maintained in order to not damage the membrane electrode assembly.

In another preferred embodiment of the invention, the filling agent is connected to the bipolar plate. In this case, the filling agent is advantageously fixed on the bipolar plate. This embodiment in particular offers a production advantage. The filling agent is in this case preferably arranged on the bipolar plate before the membrane electrode assembly is arranged on the bipolar plate. The arrangement of the filling agent on the bipolar plate can thus take place independently of the tolerances of the membrane electrode assembly to be maintained, without the latter being damaged. In this embodiment, the filling agent is either glued as cured material on the bipolar plate or applied in non-cured form to the bipolar plate by means of a dispenser.

Another embodiment of the invention provides that the filling agent is designed in several pieces (with respect to one layer). This advantageously results in a material savings with an increase in flexibility at the same time, in particular with respect to the shape of the bipolar plate and the layers adjoining it. In addition, the arrangement according to the invention of the filling agent in the cavity may be combined with additional measures for reducing the reactant bypass flow. If the filling agent is designed in several pieces, it is preferred if at least one part of the filling agent is respectively arranged on the borders of the flow field, i.e. on the two ends of the elongated cavity.

It is furthermore preferred that the sealing element is a bead gasket, i.e. a seal that, like the flow field, also results from the profiling of the bipolar plate. The advantage consists in particular in the seal, or the bead, being able to be formed during the profiling of the bipolar plate. Alternatively or additionally, the sealing element may be a polymer seal which is subsequently applied to the bipolar plate. Advantageously, the manufacturing step of applying a polymer seal can be combined with the application of the filling agent.

Another embodiment of the invention provides that the filling agent is connected to the membrane electrode assembly. By means of the direct contact between the filling agent and the membrane electrode assembly, it is achieved that the distance between the membrane electrode assembly and the bipolar plate is filled completely by the filling agent and a reactant bypass flow in this region is thus completely prevented. Alternatively to the arrangement of the filling agent on the bipolar plate, the filling agent is glued on the subgasket (the frame) of the membrane electrode assembly for this purpose.

In the arrangement of the filling agent both on the bipolar plate and on the membrane electrode assembly, it is advantageous if the filling agent overlaps the gas diffusion layer of the membrane electrode assembly. This advantageously results in a supporting of the membrane electrode assembly, in particular of the gas diffusion layer, by the filling agent.

Another aspect of the invention relates to a fuel cell system which comprises several fuel cells according to the invention and is used, for example, for the electrical supply of an electric motor for a motor vehicle.

Additional preferred embodiments of the invention arise from the other features mentioned in the dependent claims.

The various embodiments of the invention mentioned in this application may be combined advantageously with one another unless otherwise stated in individual cases.

Figure 2:
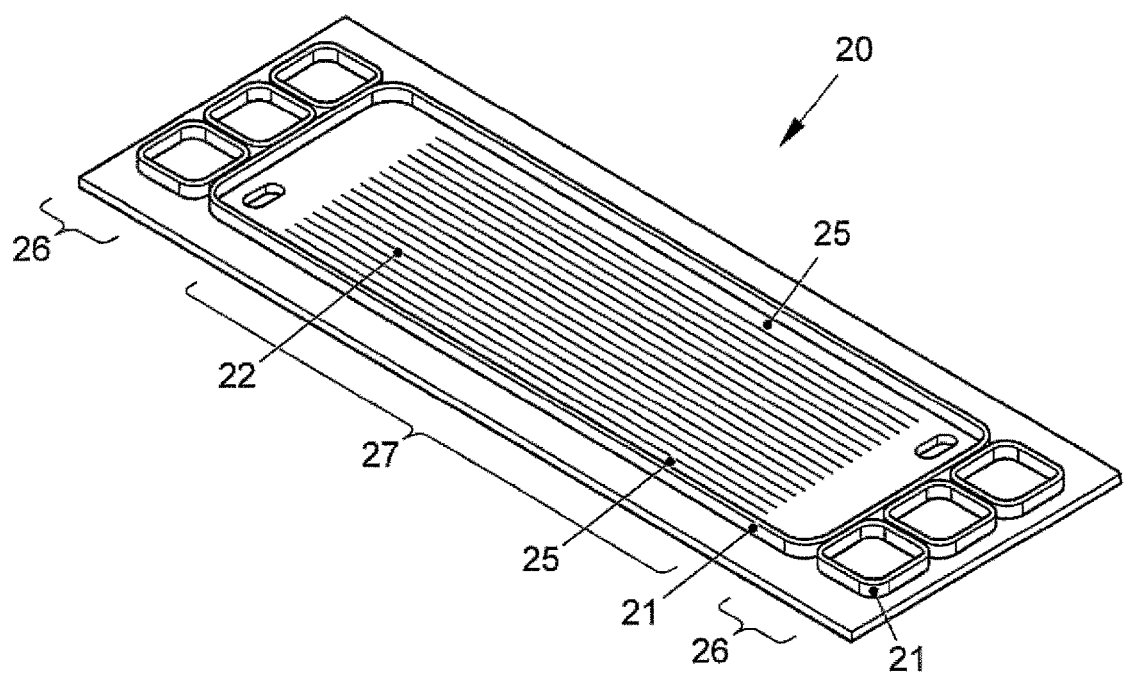
Figure 3:
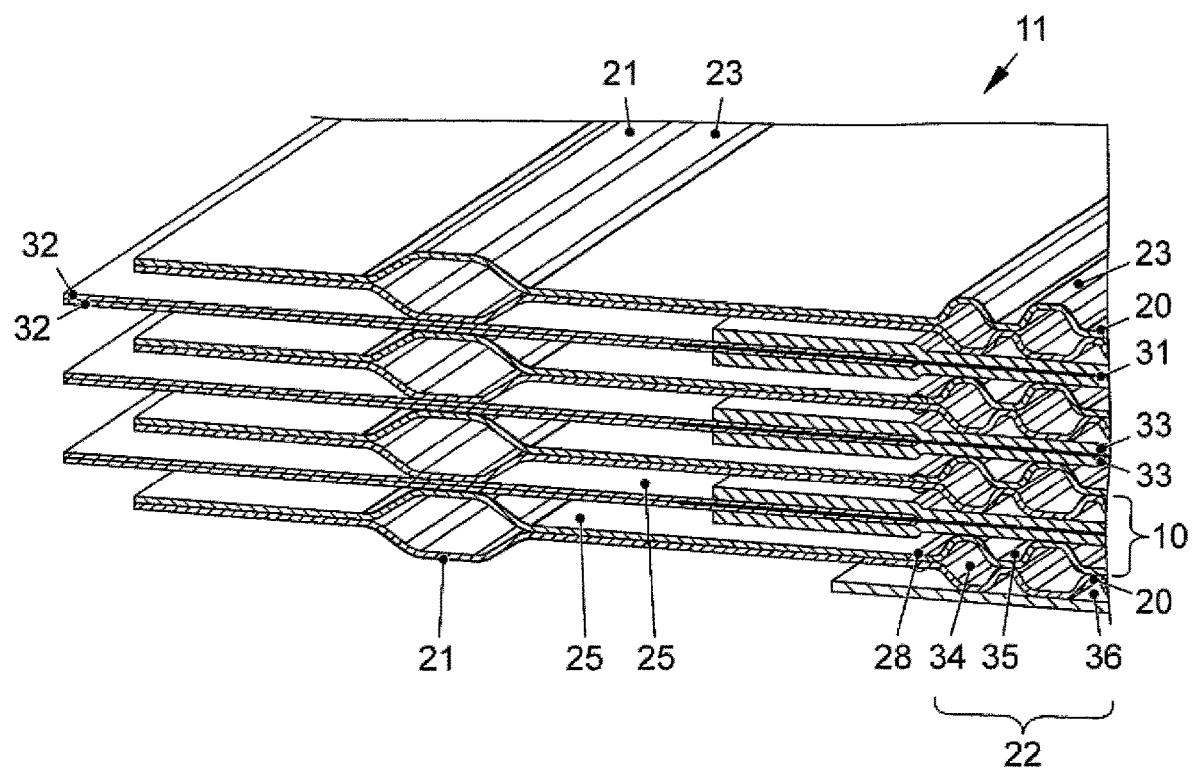
Figure 4:
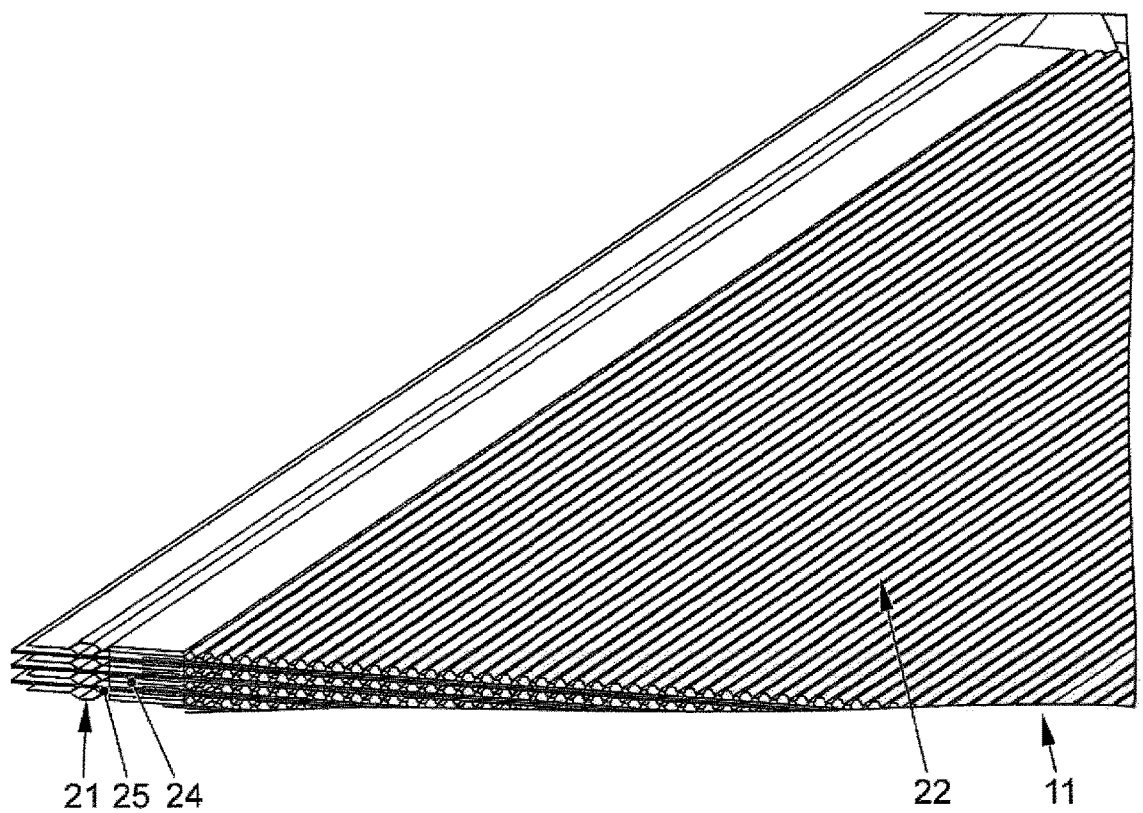
Figure 5:
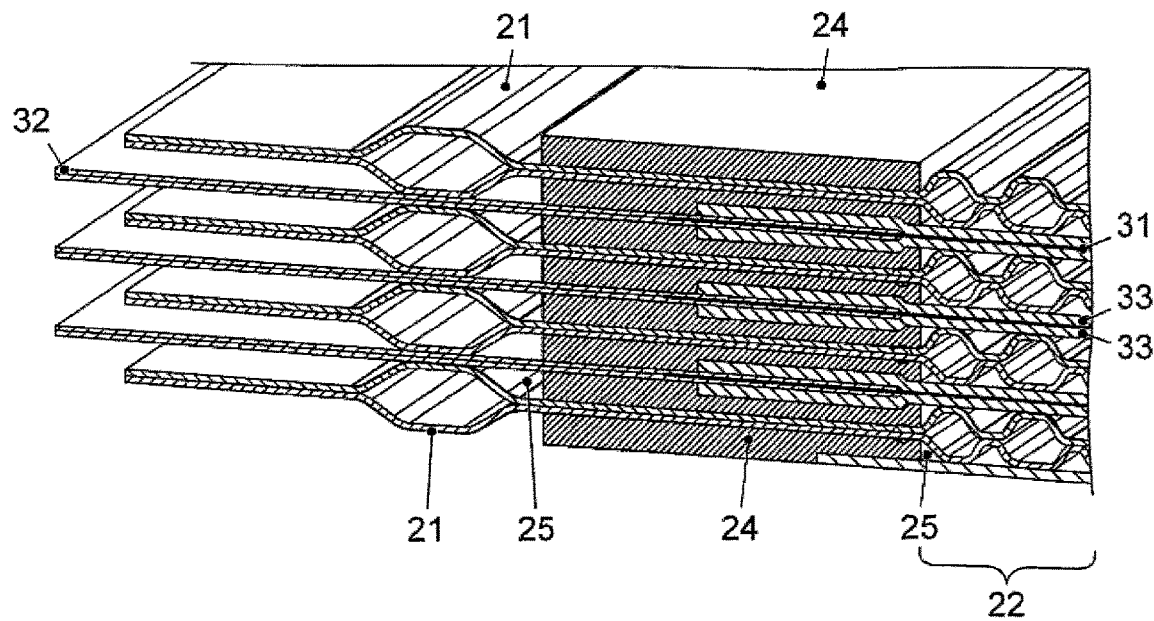
Figure 6:
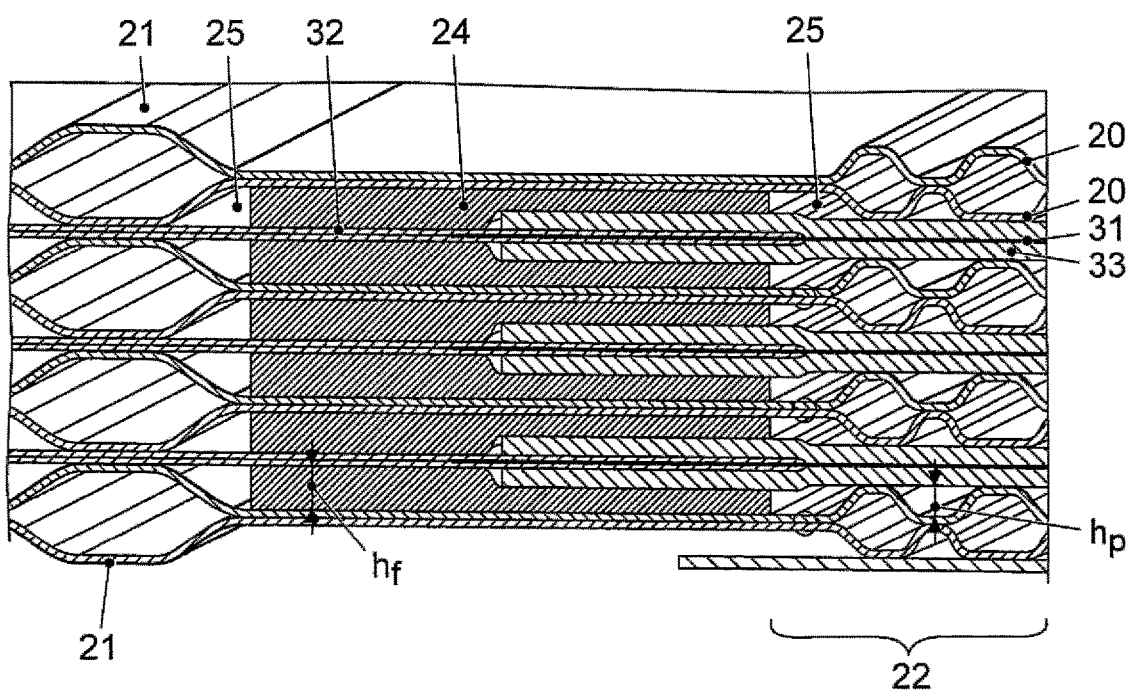

The invention is explained below in exemplary embodiments on the basis of the respective drawings. They show:

FIG. 1 a schematic representation of a fuel cell stack,

FIG. 2 a schematic representation of the top view of a bipolar plate,

FIG. 3 a schematic cross-section drawing of a fuel cell stack,

FIG. 4 a schematic representation of a fuel cell stack in a perspective view in a first preferred embodiment, FIG. 5 a schematic cross-section drawing of a fuel cell stack according to the invention in a second preferred embodiment, and FIG. 6 a schematic cross-section drawing of a fuel cell stack according to the invention in another preferred embodiment.

FIG. 1 shows a fuel cell stack 11 in a schematic representation. The fuel cell stack 11 comprises two end plates 12. Between the end plates 12 is arranged a plurality of stack elements, which are stacked on top of one another and which comprise bipolar plates 20 and membrane electrode assemblies 30. The bipolar plates 20 are stacked alternately with the membrane electrode assemblies 30. The membrane electrode assemblies 30 respectively comprise a membrane and, on both sides of the membrane, adjacent electrodes, namely an anode and a cathode (not shown). Adjacent to the membrane, the membrane electrode assemblies 30 may also comprise gas diffusion layers 33. Between the end plates 12, the fuel cell stack 11 is pressed by means of tension elements 16 such as drawbars or clamping plates.

In FIG. 1, only the narrow sides of the bipolar plates 20 and the membrane electrode assemblies 30 are visible. The main sides of the bipolar plates 20 and the membrane electrode assemblies 30 are adjacent to one another. The representation in FIG. 1 is partially not dimensionally accurate. Typically, the thickness of an individual cell consisting of a bipolar plate 20 and a membrane electrode assembly 30 is a few mm, wherein the membrane electrode assembly 30 is by far the thinner component. In addition, the number of individual cells usually is much greater than shown.

FIG. 2 shows a schematic representation of a top view of a bipolar plate 20. The bipolar plate 20 may be divided into three subregions, namely two distributor regions 26 and one active region 27. In doing so, the distributor regions 26 are respectively arranged such that they are adjacent to the active region 27 at ends of the bipolar plate 20. The distributor regions 26 comprise the supply channels for coolants and the reactant gases. The active region 27 comprises a flow field 22 resulting from a profile structure of the bipolar plate 20. Within the flow field 22, the profile structure forms channels in which the reactant gases are guided from one distributor region 26 over the active region 27 to the other distributor region 26. The flow field is delimited by a sealing element 21 laterally, i.e. at least on both sides, namely is adjoined by the sealing element 21 on the longitudinal sides of the flow field 22. Between the sealing element 21 and the flow field 22, a cavity results 25 along the longitudinal side of the flow field 22. Like the channels, the cavity 25 also constitutes a fluidic connection of the two distributor regions 26 within the profile structure of the flow field 22.

If the bipolar plate 20 shown in FIG. 2 is arranged to form a fuel cell stack on a membrane electrode assembly, this takes place such that the catalytic electrodes are arranged to be adjacent to the active region so that the fuel cell reaction only occurs in the region of the flow field 22. This means that only the reactant gases that are guided within the flow field 22 from one distributor region 26 to the other distributor region 26 are available to the fuel cell reaction. The portion of the reactant gas that is not guided over the flow field 22 but bypasses the flow field 22 via the cavity 25 is, as reactant bypass flow, not available to the fuel cell reaction.

FIG. 3 shows a cross-section drawing of a fuel cell stack 11. Shown is a stack consisting of bipolar plates 20, which are alternately arranged with membrane electrode assemblies 30. The membrane electrode assemblies 30 comprise a membrane 31, which, for example, is designed in the form of a polymer electrolyte membrane, as well as a frame 32 which stabilizes the membrane 31. The frame 32 is, for example, designed in the form of supporting foils which are laminated on both sides of the membrane 31 and leave an active region 27 adjacent to the flow field 22 open. In the active region 27, the membrane 31 is enclosed by two catalytic layers (not shown), which may be laminated on the membrane 31. The membrane electrode assembly 30 furthermore comprises two gas diffusion layers 33, which are arranged to be adjacent to the membrane 31 and which overlap the frame 32 in the embodiment shown.

The sealing element 21 shown in FIG. 3 is, by way of example, designed to be a bead gasket of the bipolar plate 20. Alternatively or additionally, the sealing element 21 may also be designed as a polymer seal, which is, for example, applied to the bipolar plate 20 or to a bead of the bipolar plate 20. FIG. 3 shows that the sealing element 21 substantially extends parallelly to the flow field 22.

The flow field 22 results from a profile structure of the bipolar plate 20. In particular, within the profile structure channels 35 result which transport the reactant gases, in particular oxygen and hydrogen, over the active region of the bipolar plate. In order to form coolant channels 34, two plates 29 are joined together to form a bipolar plate 20 such that closed coolant channels 34 form between the plates 29 in the region of the reactant gas channels 35 and 36. In order to seal the coolant channels, the plates 20, arranged directly adjacent to one another, of a bipolar plate 20 are sealed on the edge of the flow field 22 by a welded seam 28, which extends parallel to the flow field.

If such bipolar plates 20 are arranged alternately with the membrane electrode assemblies 30 to form a fuel cell stack 11, the cavity 25 arises between the sealing element 21 and the flow field 22 as a result of the profile structure of the bipolar plate 20. FIG. 4 shows how a filling agent 24 is respectively arranged inside the cavities 25. In the embodiment shown, the filling agent 24 is provided as a strip with a substantially rectangular cross section, which strip is designed as one piece over the entire length of the flow field 22. The filling agent 24 may alternatively also be designed in several pieces, wherein parts of the filling agent 24 are arranged at least in the edge region of the flow field 22, i.e. in the regions of the cavity that are adjacent to the distributor regions.

The filling agent 24 is a polymer material. Elastomers and thermoplastic elastomers are particularly suited since they are deformed by external pressure. Particularly suited materials are, for example, silicones and/or fluororubbers. According to the invention, at least one cavity 25 per fuel cell comprises such a filling agent 24. It is, however, advantageous if the cavities 25 respectively comprise a filling agent 24 both on both sides of the flow field 22 and on both sides of a bipolar plate 20. In this case, the filling agents 24 are designed in the same way on both cell sides, i.e. on the cathode and on the anode side, or are varied in their design, in particular in their material.

The filling agent 24 may be connected and arranged either on the bipolar plate 20 or on the membrane electrode assembly 30.

FIG. 5 shows the arrangement of the filling agent 24 on the bipolar plate 20. It becomes clear that, in this embodiment, the width of the cavity i.e. from the sealing element 21 to the beginning of the flow field 22 is essentially filled completely by the filling agent 24. The resulting cavity 25 which results from the bead shape is thus minimized. It is advantageous in this embodiment either to fix the filling agent 24 as a cured elastomer, such as from a soft rubber roll, self-adhesively on the bipolar plate, or to spray a non-cured elastomer onto the bipolar plate 20 inside the cavity 25 by means of a dispenser and to cure it.

FIG. 5 shows that the height $h_F$ of the filling agent 24 in the embodiment shown projects somewhat above the profile structure of the flow field 22 but does not compensate for the height of the gas diffusion layer 33. The filling agent 24 and the gas diffusion layer 33 are thus compressed in the overlapping region with the gas diffusion layer 33 during assembly of the stack, whereby a good sealing effect is achieved.

A gap arising between the filling agent 24 and the frame 32 may be eliminated by the height $h_F$ of the filling agent 24 being further increased so that the filling agent 24 is also in contact with the frame 32 of the membrane electrode assembly 30. In addition to the prevention of the reactant flow, this also has the advantage of the gas diffusion layer being clamped by the filling agent 24 and thus stabilized.

FIG. 6 shows an alternative embodiment of the invention in which the filling body 24 is arranged on the frame 32 of the membrane electrode assembly and overlaps the gas diffusion layer 33. This may, for example, occur by gluing a suitable polymer or by spraying or applying the polymer by means of a dispenser. In the drawing shown in FIG. 6, the height $h_F$ of the filling agent projects above the height $h_P$ of the profile structure and fills the height of the cavity 25. As a result of the manufacturing tolerances of the membrane electrode assembly 30, the entire width of the cavity (between the bead and the flow field) is not filled with filling agent 24 in the embodiment shown in FIG. 6. Compared to FIG. 5, the height of the cavity 25 is optimally filled in FIG. 6, while the reactant bypass flow through the cavity 25 is significantly reduced in FIG. 5 with respect to the width of the cavity 25.

The embodiments of the invention shown in FIGS. 4 to 6 have the function of reducing a reactant bypass flow through the cavity 25 by arranging a volume-filling filling agent 24 inside the cavity 25, which reduces the volume of the cavity 25 available for reactant gases and thus facilitates a flow of the reactant gases through the channels of the flow field 22.

LIST OF REFERENCE SYMBOLS

10 Fuel cell
11 Fuel cell stack
20 Bipolar plate
21 Sealing element
22 Flow field
23 Profile structure
24 Filling agent
25 Cavity
26 Distributor region
27 Active region
28 Welded seam
29 Plate
30 Membrane electrode assembly
31 Membrane
32 Frame
33 Gas diffusion layer
34 Coolant channel
35 First reactant gas channels
36 Second reactant gas channels

The invention claimed is:

1. A fuel cell having a stack, comprising:
a bipolar plate having a flow field formed by a profiled section of the bipolar plate and an elongated bead gasket that at least partially surrounds the flow field;
a membrane electrode assembly including a membrane, a first gas diffusion layer on a first side of the membrane, a second gas diffusion layer on a second side the membrane opposite to the first side of the membrane, and a stabilizing frame that is laminated directly onto the membrane, wherein the first and second gas diffusion layers are in direct contact with the stabilizing frame and overlap the stabilizing frame; and
a filling agent located within a cavity between the membrane electrode assembly and the bipolar plate and between the bead gasket and the flow field, wherein a height $h_F$ of the filling agent in non-compressed form is greater than a height of $h_P$ a profiled section of the flow field.

2. The fuel cell according to claim 1 wherein the filling agent extends over a length of the flow field.

3. The fuel cell according to claim 1 wherein the filling agent is a polymer.

4. The fuel cell according to claim 1 wherein the filling agent is connected to the bipolar plate.

5. The fuel cell according to claim 1 wherein the filling agent is glued onto the bipolar plate.

6. The fuel cell according to claim 1 wherein the filling agent includes several pieces.

7. The fuel cell according to claim 1 wherein the filling agent is connected to the membrane electrode assembly.

8. The fuel cell according to claim 1 wherein the filling agent is connected to said stabilizing frame.

9. The fuel cell according to claim 3 wherein the polymer is an elastomer or a thermoplastic elastomer.

10. A fuel cell, comprising:
a separator plate including a plurality of channels that form a reactant flow field, and an elongated gasket that at least partially surrounds the flow field;
a membrane electrode assembly including a membrane, a first gas diffusion layer on a first side of the membrane, and a second gas diffusion layer on a second side the membrane opposite to the first side of the membrane;
a cavity located between the separator plate and the membrane electrode assembly, and between an outermost one of the channels and the gasket; and
a polymer that fills more than half of the cavity, wherein the polymer is not in direct contact with the membrane of the membrane electrode assembly, and wherein a height $h_F$ of the polymer in non-compressed form is greater than a height $h_P$ of a profiled section of the reactant Dow field.

11. The fuel cell of claim 10 wherein the polymer fills more than two thirds of the cavity.

12. The fuel cell of claim 10 wherein the polymer fills more than three quarters of the cavity.

13. The fuel cell of claim 10 wherein the polymer has a rectangular cross-sectional shape.

* * * * *

UNITED STATES PATENT AND TRADEMARK OFFICE
CERTIFICATE OF CORRECTION

PATENT NO. : 10,790,520 B2
APPLICATION NO. : 15/520816
DATED : September 29, 2020
INVENTOR(S) : Christian Martin Zillich et al.

It is certified that error appears in the above-identified patent and that said Letters Patent is hereby corrected as shown below:

In the Claims

Column 8, Claim 1, Line 9:
"a height of $h_P$" should read, -- a height $h_P$ of --.

Column 8, Claim 10, Line 43:
"reactant Dow field" should read, -- reactant flow field --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*